(12) United States Patent
Barnes et al.

(10) Patent No.: US 11,708,045 B2
(45) Date of Patent: Jul. 25, 2023

(54) AIRBAGS AND METHODS FOR PRODUCTION OF AIRBAGS

(71) Applicant: INV PERFORMANCE MATERIALS, LLC, Wilmington, DE (US)

(72) Inventors: John Barnes, Dymock (GB); Neil Hunt, Cheltenham (GB); Varunesh Sharma, Johns Creek, GA (US); Martin Townson, Gloucester (GB); Anne Gauthier, Cheltenham (GB)

(73) Assignee: INV PERFORMANCE MATERIALS, LLC, Wilmington, DE (US)

( * ) Notice: Subject to any disclaimer, the term of this patent is extended or adjusted under 35 U.S.C. 154(b) by 0 days.

(21) Appl. No.: 16/650,779

(22) PCT Filed: Sep. 27, 2018

(86) PCT No.: PCT/US2018/053009
§ 371 (c)(1),
(2) Date: Mar. 25, 2020

(87) PCT Pub. No.: WO2019/067655
PCT Pub. Date: Apr. 4, 2019

(65) Prior Publication Data
US 2021/0129786 A1    May 6, 2021

Related U.S. Application Data

(60) Provisional application No. 62/633,324, filed on Feb. 21, 2018, provisional application No. 62/587,599, (Continued)

(51) Int. Cl.
*B60R 21/232* (2011.01)
*B60R 21/235* (2006.01)
(Continued)

(52) U.S. Cl.
CPC ............. *B60R 21/232* (2013.01); *B32B 5/26* (2013.01); *B60R 21/235* (2013.01); *D03D 1/02* (2013.01);
(Continued)

(58) Field of Classification Search
CPC .......... B60R 2021/23514; B60R 2021/23547; B60R 21/232; B60R 21/235;
(Continued)

(56) References Cited

U.S. PATENT DOCUMENTS 2,824,034 A    2/1958  Worby
4,442,162 A    4/1984  Kuester
(Continued)

FOREIGN PATENT DOCUMENTS

CA    2014249 C    5/1997
CA    2429770 A1   11/2003
(Continued)

OTHER PUBLICATIONS

US 9,085,839 B2, 07/2015, Fink (withdrawn)
(Continued)

Primary Examiner — Arti Singh-Pandey (57) ABSTRACT

Methods for production of automobile airbags with decreased air leakage and an increased duration of their inflated state, as well as airbags produced in accordance with these methods are provided.

20 Claims, 1 Drawing Sheet

Related U.S. Application Data filed on Nov. 17, 2017, provisional application No. 62/565,195, filed on Sep. 29, 2017.

(51) Int. Cl.
| | | |
|---|---|---|
| *D06M 10/00* | (2006.01) | |
| *B32B 5/26* | (2006.01) | |
| *D03D 11/00* | (2006.01) | |
| *D06N 3/00* | (2006.01) | |
| *D06N 3/12* | (2006.01) | |
| *D03D 1/02* | (2006.01) | |

(52) U.S. Cl.
CPC ........... *D03D 11/00* (2013.01); *D06M 10/006* (2013.01); *D06N 3/004* (2013.01); *D06N 3/0006* (2013.01); *D06N 3/0013* (2013.01); *D06N 3/12* (2013.01); *B60R 2021/23514* (2013.01); *B60R 2021/23547* (2013.01); *D06N 2207/123* (2013.01); *D06N 2209/12* (2013.01); *D06N 2211/268* (2013.01); *D10B 2505/124* (2013.01)

(58) Field of Classification Search
CPC .... D10B 2505/124; B32B 5/26; D03D 11/00; D03D 1/02; D06M 10/006; D06N 2207/123; D06N 2209/12; D06N 2211/268; D06N 3/0006; D06N 3/0013; D06N 3/004; D06N 3/12; C09D 111/00; C09D 175/04; C09D 183/04
See application file for complete search history.

(56) References Cited

U.S. PATENT DOCUMENTS

| | | |
|---|---|---|
| 4,921,735 A | 5/1990 | Klaus |
| 4,977,016 A | 12/1990 | Thornton et al. |
| 5,073,418 A | 12/1991 | Thornton et al. |
| 5,076,975 A | 12/1991 | Davis |
| 5,093,163 A | 3/1992 | Krummheuer et al. |
| 5,110,666 A | 5/1992 | Menzel et al. |
| 5,236,775 A | 8/1993 | Swoboda et al. |
| 5,370,925 A | 12/1994 | Koseki |
| 5,441,798 A | 8/1995 | Nishimura et al. |
| 5,540,965 A | 7/1996 | Nishimura et al. |
| 5,618,595 A | 4/1997 | Matsushima et al. |
| 5,763,330 A | 6/1998 | Bertoilucci et al. |
| 5,782,489 A | 7/1998 | LaLonde |
| 5,826,905 A | 10/1998 | Tochacek et al. |
| 5,863,644 A | 1/1999 | Bonigk et al. |
| 5,879,767 A | 3/1999 | Matsushima et al. |
| 5,897,929 A | 4/1999 | Li et al. |
| 5,928,721 A | 7/1999 | Parker et al. |
| 5,994,243 A | 11/1999 | Bowen et al. |
| 6,024,380 A | 2/2000 | Kim et al. |
| 6,291,040 B1 | 9/2001 | Moriwaki et al. |
| 6,344,251 B1 | 2/2002 | Keshavaraj et al. |
| 6,399,155 B2 | 6/2002 | Child et al. |
| 6,458,725 B1 | 10/2002 | Masuda et al. |
| 6,488,311 B2 | 12/2002 | Kato et al. |
| 6,520,539 B1 | 2/2003 | Ritter et al. |
| 6,576,574 B2 | 6/2003 | Child et al. |
| 6,598,902 B2 | 7/2003 | Keshavaraj |
| 6,601,614 B1 | 8/2003 | Ishii |
| 6,607,797 B1 | 8/2003 | Ritter |
| 6,630,220 B1 | 10/2003 | Veiga |
| 6,632,754 B1 | 10/2003 | Rose |
| 6,659,501 B2 | 12/2003 | Rychter |
| 6,685,220 B2 | 2/2004 | Ohhashi et al. |
| 6,698,790 B2 | 3/2004 | Iseki et al. |
| 6,749,220 B1 | 6/2004 | Wipasuramonton et al. |
| 6,770,578 B2 | 8/2004 | Veiga |
| 6,886,857 B1 | 5/2005 | Mishina et al. |
| RE38,769 E | 8/2005 | Keshavaraj et al. |
| 6,971,674 B2 | 12/2005 | Johansson |
| 7,468,334 B2 | 12/2008 | Schindzielorz |
| 7,501,359 B2 | 3/2009 | Li |
| 7,514,030 B2 | 4/2009 | Nilsson et al. |
| 7,681,917 B2 | 3/2010 | Guillo et al. |
| 7,686,331 B2 | 3/2010 | Li et al. |
| 7,780,194 B2 | 8/2010 | Trondle et al. |
| 8,007,630 B1 | 8/2011 | Keshavaraj et al. |
| 8,132,826 B2 | 3/2012 | Schindzielorz |
| 8,267,423 B2 | 9/2012 | Wipasuramonton et al. |
| 8,287,685 B2 | 10/2012 | Be et al. |
| 8,333,220 B2 | 12/2012 | King |
| 8,361,582 B2 | 1/2013 | Jarvis et al. |
| 8,376,401 B2 | 2/2013 | Wipasuramonton et al. |
| 8,408,597 B2 | 4/2013 | Teshima et al. |
| 8,431,647 B2 | 4/2013 | Dumont et al. |
| 8,485,550 B2 | 7/2013 | Kino et al. |
| 8,733,788 B2 | 5/2014 | Finn et al. |
| 8,778,130 B2 | 7/2014 | Schindzielorz |
| 8,960,714 B2 | 2/2015 | Kim et al. |
| 9,067,564 B2 | 6/2015 | Kemp et al. |
| 9,079,558 B2 | 7/2015 | Crouch |
| 9,085,834 B2 | 7/2015 | Huber |
| 9,284,667 B2 | 3/2016 | Pai |
| 9,469,268 B2 | 10/2016 | Sugimoto |
| 9,815,430 B2 | 11/2017 | Tanaka |
| 9,822,471 B2 | 11/2017 | Ise |
| 9,868,413 B2 | 1/2018 | Ise |
| 9,896,787 B2 | 2/2018 | Kim et al. |
| 10,259,421 B2 | 4/2019 | Ise |
| 2002/0017779 A1 | 2/2002 | Gilpatrick et al. |
| 2002/0140218 A1 | 10/2002 | Beasley |
| 2002/0195808 A1 | 12/2002 | Chiou et al. |
| 2003/0163907 A1 | 9/2003 | Sakurai et al. |
| 2004/0014386 A1 | 1/2004 | Soelch et al. |
| 2004/0017070 A1 | 1/2004 | Olson |
| 2004/0029468 A1 | 2/2004 | Kim et al. |
| 2004/0171325 A1 | 9/2004 | Woods |
| 2005/0181168 A1 | 8/2005 | Barnes et al. |
| 2006/0151882 A1 | 7/2006 | Trondle et al. |
| 2006/0163853 A1 | 7/2006 | Keshavaraj et al. |
| 2006/0183390 A1 | 8/2006 | Fukunishi et al. |
| 2006/0192372 A1 | 8/2006 | Khouri et al. |
| 2006/0192373 A1 | 8/2006 | Manley |
| 2006/0237957 A1 | 10/2006 | Woydick |
| 2006/0252322 A1 | 11/2006 | DeBenedictis et al. |
| 2007/0007756 A1 | 1/2007 | Okuno et al. |
| 2007/0031621 A1 | 2/2007 | Morimoto et al. |
| 2009/0020213 A1 | 1/2009 | Iwata et al. |
| 2009/0058051 A1 | 3/2009 | Hatfield et al. |
| 2009/0247030 A1 | 10/2009 | Kano et al. |
| 2009/0297723 A1 | 12/2009 | Keshavaraj et al. |
| 2010/0109305 A1 | 5/2010 | Miyata |
| 2010/0159189 A1 | 6/2010 | Takagi et al. |
| 2010/0260976 A1 | 10/2010 | Kano et al. |
| 2011/0076479 A1 | 3/2011 | Danielson et al. |
| 2011/0316263 A1 | 12/2011 | Lunt et al. |
| 2012/0038131 A1 | 2/2012 | Muller et al. |
| 2012/0205901 A1 | 8/2012 | Westoby |
| 2013/0026740 A1* | 1/2013 | Finn ................. B32B 5/024 280/728.1 |
| 2013/0033027 A1 | 2/2013 | Kim et al. |
| 2013/0035014 A1 | 2/2013 | Tone et al. |
| 2013/0189887 A1 | 7/2013 | Akechi et al. |
| 2013/0280444 A1* | 10/2013 | Kim ................. B60R 21/231 428/12 |
| 2013/0295301 A1 | 11/2013 | Schmitt et al. |
| 2014/0265279 A1 | 9/2014 | Ise et al. |
| 2014/0272271 A1 | 9/2014 | Tam et al. |
| 2014/0363636 A1 | 12/2014 | Gubler et al. |
| 2015/0167207 A1 | 6/2015 | Bongartz et al. |
| 2015/0246655 A1 | 9/2015 | Furuniwa et al. |
| 2015/0329998 A1 | 11/2015 | Ise |
| 2015/0368834 A1 | 12/2015 | Ise |
| 2016/0130748 A1 | 5/2016 | Veiga |
| 2017/0067189 A1 | 3/2017 | Yokoi |
| 2017/0073856 A1 | 3/2017 | Myers et al. |

(56) References Cited

U.S. PATENT DOCUMENTS

| | | |
|---|---|---|
| 2017/0080678 A1 | 3/2017 | Bhatnagar et al. |
| 2018/0014584 A1 | 1/2018 | Kai et al. |
| 2018/0327940 A1 | 11/2018 | Hunt et al. |

FOREIGN PATENT DOCUMENTS

| | | |
|---|---|---|
| CA | 2507457 C | 8/2009 |
| CN | 1155597 A | 7/1997 |
| CN | 1487890 A | 4/2004 |
| CN | 1771153 A | 5/2006 |
| CN | 101356081 A | 1/2009 |
| CN | 101481850 A | 7/2009 |
| CN | 101033569 B | 12/2010 |
| CN | 102220685 A | 10/2011 |
| CN | 1449338 B | 6/2012 |
| CN | 102859056 A | 1/2013 |
| CN | 102933756 A | 2/2013 |
| CN | 103173908 A | 6/2013 |
| CN | 103403240 A | 11/2013 |
| CN | 103649393 A | 3/2014 |
| CN | 103726168 A | 4/2014 |
| CN | 104520481 A | 4/2015 |
| CN | 105189843 A | 12/2015 |
| CN | 105256597 A | 1/2016 |
| CN | 106164350 A | 11/2016 |
| CN | 105568704 B | 11/2017 |
| CO | 5840240 A1 | 12/2007 |
| DE | 2150481 A1 | 4/1973 |
| DE | 4009611 A1 | 10/1991 |
| DE | 4206997 A1 | 9/1993 |
| DE | 19852232 A1 | 5/2000 |
| DE | 10202715 A1 | 12/2002 |
| DE | 10153243 B4 | 11/2008 |
| DE | 102008057169 A1 | 5/2010 |
| DE | 102012019945 A1 | 4/2013 |
| DE | 102012008481 A1 | 10/2013 |
| DE | 102017003568 A1 | 1/2018 |
| EP | 0156102 A2 | 10/1985 |
| EP | 0768405 A1 | 4/1997 |
| EP | 0611683 B1 | 8/1997 |
| EP | 0656842 B1 | 12/1998 |
| EP | 0896562 A1 | 2/1999 |
| EP | 0682136 B1 | 7/1999 |
| EP | 0962363 A1 | 12/1999 |
| EP | 0963468 A1 | 12/1999 |
| EP | 0747518 B1 | 5/2002 |
| EP | 0624210 B1 | 6/2002 |
| EP | 1255892 B1 | 7/2004 |
| EP | 0416483 B2 | 9/2004 |
| EP | 0930988 B1 | 6/2005 |
| EP | 1475475 B1 | 6/2008 |
| EP | 2199062 A1 | 6/2010 |
| EP | 2202120 A1 | 6/2010 |
| EP | 2221405 A1 | 8/2010 |
| EP | 2256237 A1 | 12/2010 |
| EP | 1963564 B1 | 2/2013 |
| EP | 2586664 A1 | 5/2013 |
| EP | 1963143 B1 | 11/2013 |
| EP | 3279377 A1 | 2/2018 |
| EP | 3323919 A1 | 5/2018 |
| EP | 2388135 B1 | 7/2019 |
| FR | 941030 A | 12/1948 |
| GB | 0226247 | 12/2002 |
| JP | S6021978 A | 2/1985 |
| JP | H04228648 A | 8/1992 |
| JP | H0516755 A | 1/1993 |
| JP | H06286547 A | 10/1994 |
| JP | H08176932 A | 7/1996 |
| JP | H09143835 A | 6/1997 |
| JP | 02-705307 B2 | 1/1998 |
| JP | H10-076895 A | 3/1998 |
| JP | 10-102029 A | 4/1998 |
| JP | 10-266040 A | 10/1998 |
| JP | 02-935939 B2 | 8/1999 |
| JP | 03-036215 B2 | 4/2000 |
| JP | 03-147239 B2 | 3/2001 |
| JP | 2001-507759 A | 6/2001 |
| JP | 2002-266195 A | 9/2002 |
| JP | 2002363835 A | 12/2002 |
| JP | 03-457739 B2 | 10/2003 |
| JP | 2003-293241 A | 10/2003 |
| JP | 2004-156166 A | 6/2004 |
| JP | 2004-176221 A | 6/2004 |
| JP | H03-536552 B2 | 6/2004 |
| JP | 2004-339640 A | 12/2004 |
| JP | 03-720895 B2 | 11/2005 |
| JP | 2006-027373 A | 2/2006 |
| JP | 3-873243 B2 | 1/2007 |
| JP | 03-983096 B2 | 9/2007 |
| JP | 2008507455 A | 3/2008 |
| JP | 2009-062643 A | 3/2009 |
| JP | 2007116676 A1 | 8/2009 |
| JP | 2009-227017 A | 10/2009 |
| JP | 2009536125 A | 10/2009 |
| JP | 2010-018901 A | 1/2010 |
| JP | 2010-023718 A | 2/2010 |
| JP | 2010203023 A | 9/2010 |
| JP | 4603297 B2 | 12/2010 |
| JP | 2011503374 A | 1/2011 |
| JP | 4733299 B2 | 7/2011 |
| JP | 2011-152880 A | 8/2011 |
| JP | 2011-168131 A | 9/2011 |
| JP | 2011168919 A | 9/2011 |
| JP | 04-848658 B2 | 12/2011 |
| JP | 2013-078977 A | 5/2013 |
| JP | 05-318659 B2 | 10/2013 |
| JP | 2015017356 A | 1/2015 |
| JP | 2015028234 A | 2/2015 |
| JP | 05-706924 B2 | 4/2015 |
| JP | 2015-104998 A | 6/2015 |
| JP | 2017-036530 A | 2/2017 |
| JP | 2017-065507 A | 4/2017 |
| JP | 2017-105350 A | 6/2017 |
| JP | 2019501310 A | 1/2019 |
| KR | 100504301 B1 | 7/2005 |
| KR | 20090102707 A | 9/2009 |
| KR | 10-2011-0001498 A | 1/2011 |
| KR | 10-2011-0035271 A | 4/2011 |
| KR | 10-1103802 B1 | 1/2012 |
| KR | 10-1590152 B1 | 1/2016 |
| KR | 10-1621078 B1 | 5/2016 |
| KR | 20160080952 A | 7/2016 |
| KR | 10-2016-149797 A | 12/2016 |
| KR | 10-2017-0079655 A | 7/2017 |
| KR | 10-2018-0036313 A | 4/2018 |
| KR | 10-2018-0072332 A | 6/2018 |
| KR | 10-1864888 B1 | 6/2018 |
| WO | 1998/012075 A1 | 3/1998 |
| WO | 2003/053678 A1 | 7/2003 |
| WO | 03059698 A1 | 7/2003 |
| WO | 2009119302 A1 | 10/2009 |
| WO | 2012026455 A1 | 3/2012 |
| WO | 2014/017967 A1 | 1/2014 |
| WO | 2014/104240 A1 | 7/2014 |
| WO | 2015/130882 A1 | 9/2015 |
| WO | 2015/137495 A1 | 9/2015 |
| WO | 2017/079499 A1 | 5/2017 |
| WO | 2017/169388 A1 | 10/2017 |
| WO | 2017/176892 A1 | 10/2017 |
| WO | 2018/204154 A1 | 8/2018 |
| WO | 2019/067655 A1 | 4/2019 |
| WO | 2020222111 A1 | 11/2020 |

OTHER PUBLICATIONS

International Search Report and Written Opinion received for PCT application No. PCT/US2018/029504, dated Jul. 27, 2018, 14 pages.

International Search Report and Written Opinion received for PCT application No. PCT/US18/53009, dated Dec. 3, 2018, 9 pages.

International Search Report and Written Opinion Received for PCT Patent Application No. PCT/US2016/060436, dated Feb. 6, 2017, 11 Pages.

(56) References Cited

OTHER PUBLICATIONS

International Preliminary Report on Patentability Received for PCT Patent Application No. PCT/US2016/060436, dated May 17, 2018, 9 Pages.
Barnes, et al., "Experimental Determination of the Heat Resistive Properties of Airbag Fabrics" Proc. 8th World Textile Congress, Industrial, Technical and High Performance Textiles, University of Huddersfield, Jul. 15-16, 1998, pp. 329-338.
International Preliminary Report on Patentability Report Received for PCT Patent Application No. PCT/US2015/017646, dated Aug. 30, 2016, 12 pages.
International Search Report and Written Opinion Received for PCT Application No. PCT/US2015/017646, dated May 28, 2015, 14 pages.
International Search Report and Written Opinion for International Applicatio No. PCT/US2018/053009, dated Dec. 3, 2018, 8 pages.
Office Action received for CO Application No. NC2020/0005105, dated Jan. 18, 2022, 15 Pages (07 Pages of English Translations and 08 Pages of Official notification).
Notification of Reason for Refusal received for KR application No. 10-2020-7009284, dated Dec. 8, 2021, 18 pages (9 pages of English Translation and 9 pages of Original document).
GB Search Report received for GB Application No. GB2017017576.6 dated Mar. 12, 2021, 3 pages.
International Search Report and Written Opinion received for PCT Application No. PCT/IB2021/060281, dated Jan. 31, 2022, 15 pages.
First Office Action and Search Report received for CN application No. 202011611254.9, dated May 7, 2022, 23 pages. (12 pages of English translation and 11 pages of Official copy).
Notification of Reasons for Refusal received for JP application No. 2020-517914, dated May 24, 2022, 6 pages (3 pages of english translation and 3 pages of official copy).
Office action received for CO application No. NC2019/0011452, dated May 9, 2022, 16 pages (6 pages of english translation and 10 pages of official copy).
Notice of Allowance received for CN Application No. 202010498230.0, dated Sep. 5, 2022, 07 Pages (03 Pages of English Translation and 04 Pages of Official notification).
Notice of Allowance received for KR Application No. 10-2020-7009284, dated Jul. 28, 2022, 6 pages. (2 pages of English translation and 4 pages of Official copy).
Office action received for CN Application No. 201880062470 7, dated Sep. 21, 2022, 23 pages (13 pages of English Translation and 10 pages of official notification).
First office action and search report received for CN application No. 202010126427.1, dated Nov. 23, 2020, 10 pages. (3 pages of English translation and 7 pages of official copy).
He, J., et al., "Crystallization of polypropylene, nylon-66 and poly(ethylene terephthalate) at pressures to 200 MPa: Kinetics and characterization of products", Journal of Polymer Sceince, part B: Polymner Physics, vol. 32, Issue 6, Apr. 30, 1994, pp. 1049-1067.
Notice of allowance Received for KR application No. 10-2019-7032142, dated Sep. 9, 2020, 3 Pages. (2 Pages of English translation and 1 page of official notification).
Notification of Reasons for Refusal received for JP application No. 2018-543047, dated Oct. 13, 2020, 10 pages. (5 pages of English translation and 5 pages of official notification).

\* cited by examiner

AIRBAGS AND METHODS FOR PRODUCTION OF AIRBAGS

FIELD

The invention relates to methods for production of airbags and airbags produced thereby. The methods disclosed herein can be used to produce airbags with decreased leakage from their seams, thus leading to an increase in duration of the inflated state of the airbag.

BACKGROUND

Inflatable airbags are of key component of vehicle safety systems. Airbags are one form of inflatable passive safety restraint device which are now standard in automotive use. In recent years, the number of airbags and area of coverage for these airbags has increased. Multiple air bag configurations in use include air bags for the front seating area, for side impact protection, for rear seat use, for use in headliner area inflatable curtains, and for use in inflatable seat belts.

More recently, there has become a greater demand for head and upper body protection during side and lateral vehicle collisions in motor vehicle, among others. Occupants killed in side impact crashes typically have higher incidences of head, neck and upper body injuries. Existing driver-side, passenger-side, and, more recently, side impact cushions help to prevent or limit injuries, but are not designed to protect the heads of occupants, particularly in the event of a rollover condition or a clear side strike from another vehicle.

In order to protect the head and upper body during rollover conditions, airbag curtains have been designed that are typically installed in the roof or roof supports of automobiles. When a sensor is triggered to activate the airbag curtains, the curtains will expand to at least partially cover parts of the windows of the vehicle, or, in some cases, the entire interior side of the vehicle. Airbags that are designed for rollover protection are different from conventional front and side airbags in that they are designed to remain inflated for a longer period of time as compared to front impact airbags, which preferably lose some air during passenger impact with the bag in order to cushion the blow, rather than allowing the passenger to rebound off the inflated bag.

To meet the requirements for effective inflation, airbag fabrics for rollover protection must have the ability to resist the passage of air, which is characterized by different measures of air permeability and porosity. Therefore, it is desirable for woven nylon or polyester rollover airbags to have a very low porosity and correspondingly low air permeability. While fabric properties, such as the linear density of the yarns, twist factors, weave construction and thickness and weight, all influence air permeability, it has usually been necessary to add a coating or additional layer to airbag fabrics to meet industry standards.

However, as automotive trends move to smaller and lighter vehicles, less space is sometimes available for mandatory safety items such as airbags, while some of the airbags need to be physically larger to meet evolving automotive safety standards. This has led to the problematic situation of some airbag modules needing to be smaller while some airbags need to be larger. Methods have evolved which pack airbags at higher pressures and/or temperatures. While such methods result in an improvement in packability of the airbag within the module, they also tend to be expensive and add complexity to the airbag module manufacturing process.

Creating an air and liquid impervious structure has traditionally been achieved via various forms of coated fabrics from processes like gap coating, reverse roll, rotary screen, transfer, extrusion, hot melt, lamination, impregnation and metering rod. All of the resulting structures add significant cost and thickness to the base fabric.

Depending on their complexity, airbags can be made of flat-woven fabric, which is cut and seamed, or in one piece with woven seams (One-Piece Woven or OPW). These OPW airbags give designers immense flexibility in creating patterns and designs. They also reduce the number of production steps, thereby minimizing production time. OPW airbags are woven on modern high-speed weaving machines from a variety of warp and weft material in a variety of patterns and shapes.

A problem with prior OPW concepts is their inability to hold air for the time period required in rollover situations. Some OPW designs utilize a coating on the exterior surfaces of the cushion in order to meet the inflation time requirement, which requires that the cushion be coated with up to 150 g/m$^2$ on each side of the cushion. This is due to the transition from the plain woven areas of the bag to the seam areas of the bag. This transitional area, which is the main focus as the bag inflates, can tend to separate an external coating from the surface of the woven fabric, resulting in leakage at the seams of the bag. An airbag fabric (including an OPW airbag fabric) can be calendered under conditions to at least partially deform and fuse filaments within the synthetic fibers of the airbag fabric, for example, polyamide airbag fabrics such as nylon-6,6. The behavior of the transitional areas has proven especially problematic in that calendering does not satisfactorily improve the air permeability of these transition regions, also referred to as "seams." Coatings that have proven acceptable for reducing air permeability in other (non-transition or non-seam) regions of the airbag fabric (especially OPW airbag fabrics) has not performed acceptably well in the transition regions ("seams"). Examples of calendered airbag fabrics are disclosed in WO2017/079499, published 11 May 2017; and PCT/US2018/029504, filed 26 Apr. 2018.

U.S. Published Patent Application No. 2002/0140218 discloses a one-piece woven airbag having an upper layer, a lower layer and a joining edge. A coating or laminating layer is associated with the interior side of the upper and lower layers and the joining edge is positioned inside the bag. A method of manufacturing an airbag includes forming a one piece bag, cutting the bag, turning the bag inside out, and closing the bag. The bag is turned inside out through the cut portion so that coated sides of the layers and the joined edge are disposed inside the bag.

U.S. Pat. Nos. 7,780,194 and 8,733,788 illustrate in FIGS. 1 and 4 thereof respectively, cross-sectional representations of one-piece woven airbags, where two layers are woven into a single layer. U.S. Pat. No. 7,686,331 illustrates the location and configuration of a side curtain airbag in FIGS. 2 and 3 thereof.

However, there is still a need for improved rollover airbags with reduced packing volume which still exhibit safe duration of the inflated state.

SUMMARY

The present invention relates to airbags with an increase in duration of the inflated state of the airbag and methods for their production. Accordingly, an aspect of the present invention relates to methods for decreasing air leakage from a one piece woven (OPW) airbag.

Presented herein is a method for decreasing air leakage from a one piece woven (OPW) airbag, said method comprising forming an OPW airbag having seams; and applying a hot melt sealant material to one or more seams of the OPW airbag.

In one form, the method further comprises calendering the OPW airbag before application of the sealant material to the one or more seams.

In another form, the method further comprises applying a lightweight coating over the OPW airbag, after applying the sealant material to the one or more seams.

In this form, the lightweight coating can be in the form of a lightweight film selected from polyurethanes, polyamides, polyolefins and polyesters, or formed from silicone-based coatings such as poly-dimethylenesiloxane, polyurethane and rubber compositions such as polychloroprene, having a weight per unit area selected from ranges selected from the group consisting of from $\geq 5$ g/m$^2$ to $\leq 40$ g/m$^2$ and from $\geq 5$ g/m$^2$ to $\leq 20$ g/m$^2$.

In another form, the hot melt sealant material has a melting range less than that of a fabric of the OPW airbag, such as from $\geq 50°$ C. to $\leq 180°$ C., or from $\geq 120°$ C. to $\leq 160°$ C.

In yet another form, the method further comprises melting, adhering, and compressing the sealant material into the OPW airbag seam, and optionally calendaring the OPW airbag after application of the sealant material.

Advantageously, the hot melt sealant material further comprises tracer compound which when illuminated with ultraviolet light fluoresces in the visible light range, and the method further comprises tracing the application of the hot melt sealant material with ultraviolet light.

Conveniently, the hot melt sealant material is selected from a micropore penetrable, low viscosity, low surface tension sealant, a low thickness film, an adhesive web, or an impermeable multi-layer film.

In another form, the hot melt sealant material is a low viscosity sealant which is curable by heat, light or chemical cross-linking (including by exposure to atmospheric humidity).

Advantageously, the OPW airbag exhibits an increase in duration of its inflated state.

In one form, the method can further comprise forming a double stitch around the entire seam, located $\geq 0.2$ to $\leq 0.4$ cm into the OPW chamber away from the OPW seam, for example 0.3 cm into the OPW chamber away from the OPW seam.

Also presented herein is an OPW airbag comprising a one piece woven fabric, wherein a major portion of the fabric has multiple woven layers and a minor portion of the fabric has fewer woven layers than the major portion, and wherein a transition portion or seam connects separate major portions, and major portions to the minor portions, and wherein the seam is coated with a hot melt sealant material.

In this form, the seam (transition) constitutes $\geq 2\%$ and $\leq 14\%$ of the surface area of the OPW airbag.

In one form, the hot melt sealant material is a reactive polyurethane having a melting point range of from $\geq 50°$ C. to $\leq 180°$ C., or from $\geq 120°$ C. to $\leq 160°$ C.

In another form, the airbag is calendered before application of the hot melt sealant material.

Advantageously, the entire OPW further comprises a light weight coating selected from silicone-based coatings such as poly-dimethylenesiloxane, polyurethane and rubber compositions such as polychloroprene, having a weight per unit area selected from ranges selected from the group consisting of from $\geq 5$ g/m$^2$ to $\leq 40$ g/m$^2$ and from $\geq 5$ g/m$^2$ to $\leq 20$ g/m$^2$.

Additionally, the major portion of the fabric can be characterized by a gas permeability of <1 l/dm$^2$/min, measured by Static Air Permeability with a test area of 100 cm$^2$ and test pressure of 500 Pa.

In one form, the major portion of the fabric exhibits a low surface flatness as characterized by laser surface profilometry giving an RMS surface roughness value of <70 μm.

In another form, the hot melt sealant material is present at a level of less than 100 g/m$^2$.

Although the primary sites of leakage from the inflated OPW airbag can be observed qualitatively during the leakage tests, it is difficult to quantify the precise leakage rate through specific parts of the airbag.

In another form, the airbag can be made from an uncoated fabric in combination with seam sealing.

In one form, the airbag can have an average coating weight over the entire surface of the airbag of $\geq 10$ g/m$^2$ to $\leq 65$ g/m$^2$, or $\geq 10$ g/m$^2$ to $\leq 35$ g/m$^2$, or even $\geq 10$ g/m$^2$ to $\leq 25$ g/m$^2$.

In some forms, the airbag fabric is calendered and a light weight film is applied to the calendered airbag fabric.

In this form, the light weight film can be applied in the absence of separate seam sealing, and the light weight film can be at least one selected from polyurethanes, polyamides, polyolefins and polyesters.

Advantageously, the light weight film has weight per unit area of from $\geq 10$ g/m$^2$ to $\leq 50$ g/m$^2$, for example, from $\geq 20$ g/m$^2$ to $\leq 40$ g/m$^2$.

In another form, the airbag further comprises a double stitch around the entire seam, located $\geq 0.2$ to $\leq 0.4$ cm into the OPW chamber away from the OPW seam, for example 0.3 cm into the OPW chamber away from the OPW seam.

Additionally, presented herein is a method for decreasing air leakage from an OPW airbag, said method comprising calendering the OPW airbag, and laminating a film to the OPW airbag.

Advantageously, calendering of the OPW airbag enables a lighter weight film to be applied to the airbag whilst maintaining acceptable leakage characteristics.

In one form, calendering of the OPW airbag reduces the leakage rate through the cut edge of the airbag by in-plane gas flow.

In this form, a distribution of pore sizes in the fabric is non-homogeneous through the thickness of the single layer region.

In another form, the film is applied with heat and/or pressure, such that the through-thickness permeability of the fabric is modified such that lightweight films may be used for lamination.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein.

DETAILED DESCRIPTION

Disclosed herein are methods for production of airbags with an increase in duration of the inflated state of the airbag.

Definitions

As used herein, "air bag" means inflatable passive safety restraints for automobiles and many other forms of transportation, including military and aviation applications.

The term "light weight film" as used herein means a film having a weight from $\geq 10$ g/m$^2$ to $\leq 50$ g/m$^2$, for example, from $\geq 20$ g/m$^2$ to $\leq 40$ g/m$^2$. Suitable chemistries include polyurethanes, polyamides, polyolefins and polyesters, merely to name a few nonlimiting examples. It is to be understood that a lightweight film may require an additional adhesive layer or may be self-adhering.

The term "seam" refers to a portion of an OPW airbag, which represents a transition portion between separate major portions of the airbag which have multiple layers of woven fabric, or between major and minor portions of the airbag which have fewer layers of fabric. The seam or transitional portion extends between and connects edges between separate major portions, and between major portions and minor portions. For example, the major portion of the airbag can have two woven layers of fabric and the seam can have only one layer of woven fabric, although any number of layers of woven fabric can be present, so long as the seam has fewer layers than the major portion. The area of the seam can be from about $\geq 2\%$ of the surface area of the OPW airbag to about $\leq 20\%$, for example $\geq 4\%$ to $\leq 18\%$, for example $\geq 6\%$ to $\leq 16\%$, for example $\geq 10\%$ to $\leq 15\%$, for example less than 14% of the OPW airbag surface, and the major and minor portions of the airbag surface can be the remainder of the surface. The term "seam" and "transition portion" can be used interchangeably.

The term "low viscosity sealant" as used herein means a material that, under application conditions, at least partially fills void spaces in woven fabric to decrease air permeability. Examples of suitable viscosity ranges include from $\geq 6,000$ mPa·s to $\leq 50,000$ mPa·s, for example, from $\geq 10,000$ mPa·s to $\leq 40,000$ mPa·s, or even from $\geq 20,000$ mPa·s to $\leq 40,000$ mPa·s.

Description

A method disclosed herein is directed to decreasing air leakage from an OPW airbag and comprises forming an OPW airbag having seams and applying a hot melt sealant material to one or more seams of the OPW airbag. Advantageously, the hot melt sealing material is applied only to the one or more seams, and not to the remainder of the airbag.

The method can further include applying a lightweight coating over the OPW airbag. In this non-limiting embodiment, the hot melt sealant material can be applied to the one or more seams before application of the lightweight coating, which can be, for example, a silicone elastomer or polyurethane coating.

The airbag can be calendered, either before or after application of the seam sealing material, and optionally scoured prior to the application of the seam sealing material to the seam(s). For example, the OPW airbag can be calendered after application of the hot melt sealant material and/or the lightweight coating. Calendering of the OPW airbag can be conducted at a linear speed of 5 m/min, cylinder temperature at 225° C. and 57 MPa nip-pressure with force 400 N/mm of fabric width. Scouring of the fabric can be conducted by ramping the temperature in a bath from 85° C. to 95° C. and passing the fabric through at 12 m/min, then drying the fabric in a four zone stenter oven at 120° C. at a linear speed of 10 m/min. Subsequently, a coating can be applied.

Non-limiting examples of hot melt sealant materials which can be applied include thermoplastic resins, such as reactive polyurethane SikaMelt 9676 from SIKA and extruded films, such as single layer or multi-layer adhesive tapes such as SST 800 from Gluetex GmbH, such as those in the form of molten beads, molten powders, or molten pellets. It can also be advantageous if the hot melt sealant materials include a tracer compound, such as a Stokes shifting dye or pigment, which when illuminated with ultraviolet light fluoresces in the visible light range. By inclusion of such a tracer compound, the extent of coverage of the hot melt sealant material can be traced with ultraviolet light during its application to the seam(s).

In another non-limiting embodiment, the seam sealant material can be a low viscosity sealant that can penetrate into the pores of the OPW airbag seams. Various techniques known for filling micro-porous material with low viscosity fluids can be used to apply the sealant, such as application of negative pressure and adjusting of the capillary forces via combination of fluid viscosity and surface tension. The hot melt sealant material is selected from molten beads, molten powders, molten pellets, a micropore penetrable, low viscosity, low surface tension sealant, a low thickness film, an adhesive web, or an impermeable multi-layer film, and is advantageously a low viscosity sealant which is curable by heat, light or chemical cross-linking (for example, curable by exposure to atmospheric humidity). Suitable low viscosity sealants can be cross-linkable silicone sealants, low thickness films, adhesive webs or impermeable multi-layer films, such as films of copolyamides, copolyesters, polyolefins, or polyurethanes.

Advantageously, the seam sealants are those which can be cured by heat, light or chemical crosslinking (including exposure to atmospheric humidity), and can be those having a melting range less than that of a fabric of the OPW airbag, such as from $\geq 50°$ C. to $\leq 180°$ C., or from $\geq 120°$ C. to $\leq 160°$ C. The seam sealing compound or the seam sealing adhesive can be present at a level of from $\geq 20$ g/m$^2$ to $\leq 100$ g/m$^2$, for example, from $\geq 30$ g/m$^2$ to $\leq 80$ g/m$^2$, for example $\geq 40$ g/m$^2$ to $\leq 60$ g/m$^2$.

The method can further comprise applying a lightweight coating over the OPW airbag. Non-limiting examples of suitable lightweight coatings include silicone-based elastomers, such as polydimethylenesiloxane, polyurethane-based coatings, and rubber compositions such as polychloroprene. Alternatively, the lightweight coating can be applied in the form of a low thickness film, an adhesive web or an impermeable multilayer film, for example a copolyimide, copolyester, polyolefin, or polyurethane film. The lightweight coatings can be applied at a weight per unit area of from about $\geq 5$ g/m$^2$ to $\leq 40$ g/m$^2$, or from about $\geq 8$ g/m$^2$ to $\leq 30$ g/m$^2$, or even from about $\geq 10$ g/m$^2$ to $\leq 20$ g/m$^2$. Lightweight coating material suppliers include Shin-Etsu, Bluestar and Dow Corning.

Advantageously, the hot melt sealant material can be applied to the one or more seams before application of the lightweight coating to the entire OPW airbag. Optionally the lightweight coating may be added only to the major portion, or to the major and minor portions only.

The presently disclosed method of using a limited amount of coating provides a fabric which matches the functional properties of a typical higher weight coated fabric. Since the heavier coating amounts of sealant are limited to a smaller section of the OPW airbag, i.e. on the seams, the present method results in an OPW airbag having a low average coating weight over the entirety of the airbag. For example, the average coating weight over the airbag can be less than or equal to about 65 g/m², such as from about 35 g/m² to about 50 g/m², or even from about 25 g/m² to about 35 g/m². The low average coating weight is advantageous in limiting the overall weight of the airbag, as well as enhancing the packability of the airbag into small volumes.

In another non-limiting embodiment, this method may further comprise calendering of the OPW airbag prior to applying the lightweight coating to the one or more seams of the OPW airbag. Calendering of the airbag can result in modifying the in-plane porosity of the fabric, by application of pressure. Similarly, a combination of calendering and lamination can modify the in-plane porosity of the fabric so that mechanisms of airflow through the plane of the fabric are greatly reduced, and thus more OPW airbags having improved inflation longevity can be made.

Additionally, reduction of the in-plane porosity of the major portion of the airbag fabric can reduce any amount of the lightweight coating which might need to be applied to enhance the impermeability of that portion of the airbag, resulting in an overall weight reduction and enhanced packability.

Desirable technical effects arising from the disclosed invention can include lower permeability in fabric and a flatter fabric surface which allows the application of very light weight films or light weight coatings to reduce permeability.

In another non-limiting embodiment, the method may further comprise weaving a double stitch portion into an area of the OPW airbag in front of the seam, or forming a double stitch around the entire seam, located ≥0.2 to ≤0.4 cm into the OPW chamber away from the OPW seam, for example 0.3 cm into the OPW chamber away from the OPW seam.

Figure 1A:
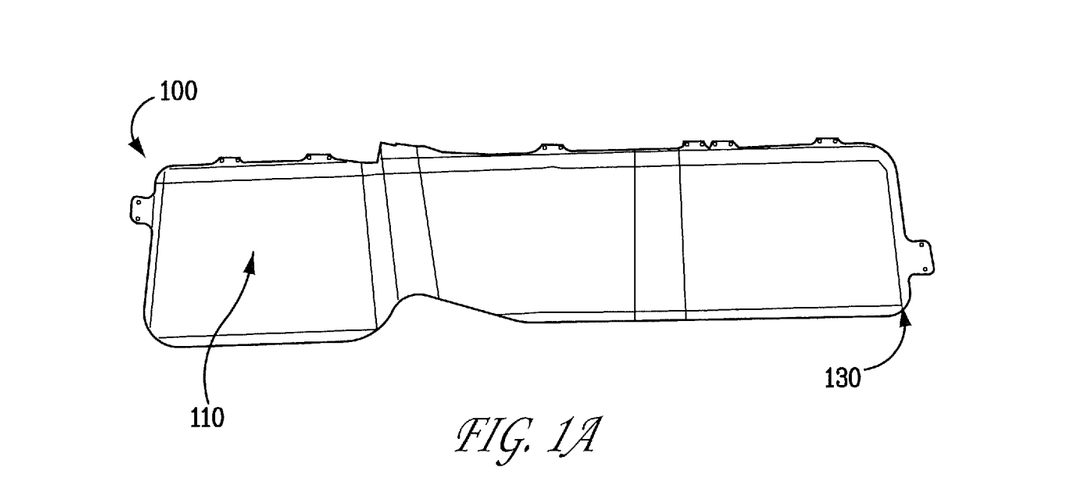
FIGS. 1A and 1B show opposite sides of an OPW airbag.
Figure 1B:
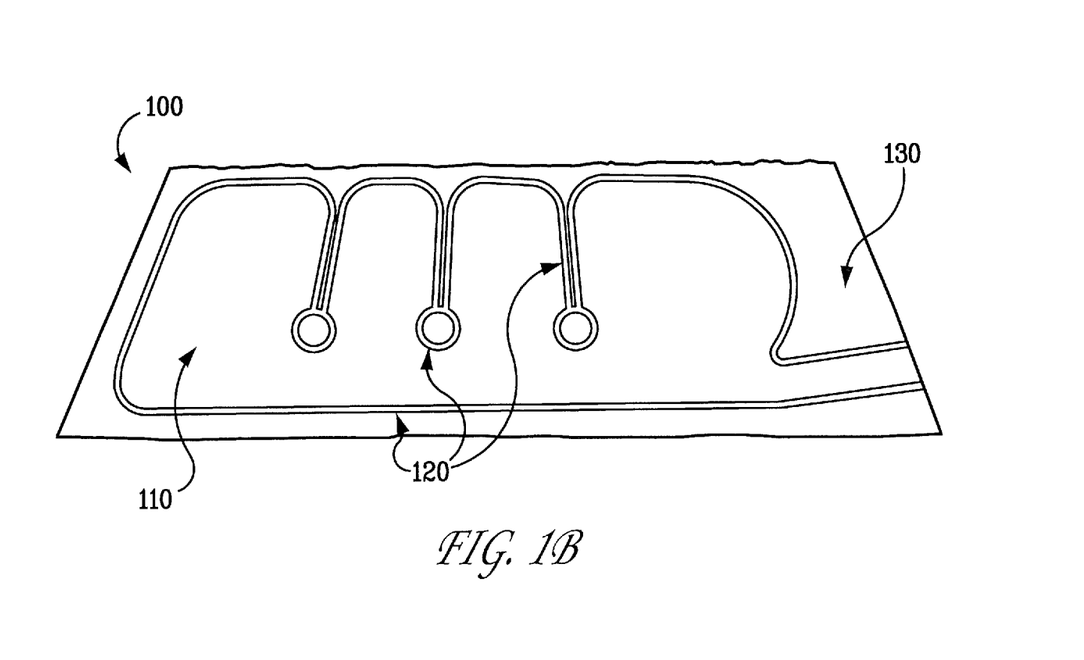

FIGS. 1A and 1B illustrate opposite sides of an OPW airbag 100 according to the present invention, having a major fabric region 110 having a greater number of layers, one or more seams (transition regions) 120, and a minor fabric region 130 having a lesser number of layers. The seam 120 and optionally the minor region 130 are coated with a seam sealant material (not shown).

Another aspect of the present invention is directed to a method for decreasing air leakage from an OPW airbag, said method comprising calendering the OPW airbag and laminating a film, especially a lightweight film, to the airbag. As discussed above, calendering of the airbag modifies the in-plane porosity of a fabric thereof. Alternatively, application of pressure during lamination to the airbag can modify the in-plane porosity of a fabric thereof, and a combination of calendering and lamination of the airbag modifies the in-plane porosity of a fabric thereof. The calendering of the OPW airbag enables a lighter weight film to be applied to the airbag whilst maintaining acceptable leakage characteristics. Calendering can also reduce the leakage rate through the cut edge of the airbag by in-plane gas flow.

Also disclosed herein are articles formed from the fabrics produced in accordance with these methods. In one non-limiting embodiment of the present invention, the fabric is used to produce an impervious product such as an automobile airbag, a sailcloth, inflatable slides, temporary shelters, tents, ducts, coverings and printed media. In one non-limiting embodiment, the article is an OPW airbag.

Further disclosed herein is an airbag fabric made by any of the above disclosed methods, which further comprises a light weight coating. In one non-limiting embodiment, the airbag fabric has a light weight coating with a weight per unit area of from ≥5 g/m² to ≤40 g/m². The light weight coating is selected from, but not limited to polychloroprene, silicone based coatings, polydimethylenesiloxane, polyurethane and rubber compositions. In another non-limiting embodiment, the majority portion of the airbag fabric is characterized by having a gas permeability of <1 l/dm²/min, measured by Static Air Permeability with a test area of 100 cm² and test pressure of 500 Pa, and exhibits a low surface flatness as characterized by laser surface profilometry giving an RMS surface roughness value of <70 µm.

It is observed that calendering as disclosed herein produces lower leakage through the fabric, but surprisingly higher leakage through the seam when in combination with the overall coating. The disclosed airbags can include calendered, uncoated fabric in combination with seam sealing. The disclosed calendered fabric can be optionally seam-sealed in either a coated or uncoated condition.

Also presented herein is an OPW airbag comprising any of the airbag fabrics described above. In one non-limiting embodiment, the airbag can be a side curtain airbag, and can have a seam sealing compound or seam sealing adhesive, wherein the seam sealing compound or the seam sealing adhesive is present at a level of less than 100 g/m².

In one form, the OPW airbag can be a one piece woven fabric, wherein a major portion of the fabric has multiple woven layers and a minor portion of the fabric has fewer woven layers than the major portion, and a transition portion or seam connects edges of separate major portions, and major portions with the minor portions, wherein the seam, and optionally the minor portion, is coated with a hot melt sealant material. For example, the seam portion constitutes from ≥2% and ≤14% of the surface area of the OPW airbag. The OPW airbag can be made of and according to, and have the characteristics of the airbag fabric, as disclosed above.

For example, the hot melt sealant material can be a reactive polyurethane having a melting point range of from ≥50° C. to ≤180° C., or from ≥120° C. to ≤160° C., and can be present at a level of less than 100 g/m².

The entire OPW airbag can have a light weight coating selected from silicone-based coatings such as poly-dimethylenesiloxane, polyurethane and rubber compositions such as polychloroprene, having a weight per unit area selected from ranges selected from the group consisting of from ≥5 g/m² to ≤40 g/m² and from ≥5 g/m² to ≤20 g/m², and can be characterized by a gas permeability of <1 l/dm²/min, measured by Static Air Permeability with a test area of 100 cm² and test pressure of 500 Pa.

Additionally, the airbag can be calendered before application of the hot melt sealant material, such that the major portion of the airbag fabric exhibits a low surface flatness as characterized by laser surface profilometry giving an RMS surface roughness value of <70 µm.

Alternatively, the OPW airbag can be made from an uncoated fabric in combination with seam sealing. However, in any event, the average coating weight over the entire surface of the airbag, i.e. over the major, minor and seam portions, is less than about 65 g/m², less than about 35 g/m², or even less than about 25 g/m².

In another form, the OPW airbag can be formed such that the airbag fabric has been calendered and wherein a light weight film has been applied to the calendered airbag fabric. The light weight film can be applied in the absence of separate seam sealing, and can be one selected from polyurethanes, polyamides, polyolefins and polyesters. Advantageously, the light weight film has weight per unit area of from ≥10 g/m² to ≤50 g/m², for example, from ≥20 g/m² to ≤40 g/m².

The OPW airbag can further comprise a double stitch around the entire seam, located ≥0.2 to ≤0.4 cm into the OPW chamber away from the OPW seam, for example 0.3 cm into the OPW chamber away from the OPW seam.

As will be understood by the skilled artisan upon reading this disclosure, alternative methods and apparatus to those exemplified herein which result in at least a portion of the yarn on the top surface or at least a portion of the yarn on the bottom surface having fibers with a permanently modified cross-section and that are at least partially melt fused together are available and use thereof is encompassed by the present invention.

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

EXAMPLES

The following Examples demonstrate the present invention and its capability for use. The invention is capable of other and different embodiments, and its several details are capable of modifications in various apparent respects, without departing from the scope and spirit of the present invention. Accordingly, the Examples are to be regarded as illustrative in nature and non-limiting.

Abbreviations

DAP Dynamic Air Permeability
dtx decitex
N66 Nylon 6,6
SAP Static Air Permeability
OPW One Piece Woven Test Methods and Procedures The following steps were performed to assess the efficacy of various conformations of OPW airbags in reducing permeability upon inflation.

(1) a number of OPW cushions, all of the same basic design, were woven on an airjet loom with a jacquard using high tenacity Nylon 6,6 yarn of 470 decitex with 136 filaments in a 20 ends/cm×18 picks/cm construction.

(2) Following the weaving process, the OPW airbag was conventionally scoured by ramping the temperature in a bath containing conventional aqueous scouring liquid, from 85° C. to 95° C., passing the fabric through the bath at 12 m/min, then drying the fabric in a four-zone stenter oven at 120° C. at a linear speed of 10 m/min.

(3) Some of the OPW cushions were treated by applying a reactive polyurethane hot-melt adhesive to at least one of the upper or lower surfaces of the OPW airbag seam. The hot-melt adhesives had melting points in the range of ≥50° C. to ≤180° C., and melt viscosities of the hot-melt adhesives were from 7,000 mPa·s to 40,000 mPa·s (measured in the range of ≥90° C. to ≤130° C. using Brookfield Thermosel brand constant temperature vessel). The preferred hot melt adhesive used had a viscosity of 30,000 mPa·s at 130° C. and a melting point in the range of ≥120° C. to ≤160° C. This type of hot melt adhesive cures on exposure to atmospheric humidity and forms a durable elastomer. The adhesive was applied using a manually heated adhesive gun at 160° C. A UV tracer was added to the hot melt adhesive. To ensure a full coverage of the seam by the adhesive a UV light was used during application. In this way a consistent and complete application of the adhesive to the entire seam may be assured.

(4) Following application of the hot melt adhesive, an external pressure was applied to the cushion at an elevated temperature to enable penetration of the adhesive into the seam structure. This may be carried out using any conventional pressure/heating process equipment. One non-limiting example of a suitable method can be calendering. Where calendering is used the pressure can be from ≥1 MPa to ≤45 MPa with a calendering roller surface temperature of ≥50° C. to ≤250° C. For example, calendering can be performed at 50 N force (ca 7 MPa) in combination with roller surface temperature of about 170° C.

For some experiments the seam sealant was applied to a previously calendered OPW cushion. In these cases, the cushion was calendered on both sides at linear speed of 5 m/min, hot roll temperature at 225° C. and 57 MPa nip-pressure with force 400 N/mm of fabric width. Such conditions compress the filaments within the fabric, and permanently deform and at least partially fuse the surface filaments in the airbag fabric of the entire OPW cushion including the seam. The calendered OPW cushion was then processed with the same hot melt adhesive application and heat/pressure processes as the non-calendered sample to enable penetration into the seam.

Some of the OPW cushions were coated using the following method: the OPW cushion was first scoured as described in Step (2), then was heat set at 150° C. for 1 minute. For coated samples an industry typical silicone coating, for example Dow Corning LCF 3600, was applied to the fabric using knife over air technique. The coating weight was controlled by adjusting the gap between the fabric and the knife. The coating was cured for 2 minutes at 150° C.

Some of the pre-calendered OPW cushions had light weight multi-layer films laminated to both surfaces. The films were laminated onto the OPW cushion surfaces by a heat and pressure technique. Two types of film were studied as below:

| Name | Number of layers | Adhesive Layer | Melting Point (° C.) | Barrier Layer | Melting Point (° C.) | Film Weight (g/m$^2$) | Pressure (N) | T (° C.) | Speed (m/min) |
|---|---|---|---|---|---|---|---|---|---|
| Film 1 | 2 | Polyurethane | 105-115 | Polyurethane | 125-135 | 40 | 300 | 225 | 5 |
| Film 2 | 2 | Polyolefin | 70-80 | Polyolefin | 104-114 | 20, 38 | 80 | 110 | 5 |

As an alternative to coating the entire cushion, some of the non-calendered and calendered OPW cushions had the same conventional silicone coating applied directly to the seam. The coating method was as described above except a mask was applied to the OPW cushion leaving only the seam areas exposed. Following the coating, the mask was removed resulting in localized seam only coating. This localized coating was typically from 40 g/m$^2$ to 80 g/m$^2$. Some of the cushions had an overall coating from 20 g/m$^2$ to 40 g/m$^2$ added to them after the localized seam only coating.

Some of the non-calendered and calendered OPW cushions had a tape applied directly to the seam using a heat and pressure technique. The tape was of two layers—a polyamide adhesive layer (melting point 120° C.) and a low permeability polyurethane membrane barrier layer (melting point 190° C.).

The OPW cushion samples prepared by the methods described above were then subject to comparative leak testing so that the relative efficacy of each of the various seam sealing techniques could be determined.

Leak Testing:

The OPW cushion was supported in a frame, and the opening of the cushion was clamped to a pressure-controlled air pipe such that an airtight seal was formed. The frame was placed in the water tank. Once the cushion was in the water, the air pressure was increased using a flow control valve. The test is designed to increase the air pressure in the cushion and to measure the total air volume to achieve specific pressures. The rate of pressure increase, and subsequent decay was measured for each cushion. Decay time is the time in seconds for the cushion to deflate from its highest achievable pressure down to atmospheric pressure, i.e., full deflation. The pressure was increased up to a maximum of 145 kPa. Once the maximum pressure was reached, the air supply was discontinued, and the cushion was allowed to deflate. This method is intended to give a relative indication of the pressure holding ability of the variously treated OPW cushions. Additionally, the inflation and subsequent deflation was recorded with a high-speed camera. Inspection of the recording enabled leakage mechanisms to be determined, such as the site of initial leakage. The initial leakage sites were in each case one of; through the face fabric of the OPW cushions chamber, through the seam, or through the cut edge of the OPW cushion by in-plane gas flow.

Examples 1(a-d)

The test data in Table 1 below show that calendering an OPW cushion [Sample 1d] results in a deterioration in leak rate compared to a non-calendered OPW cushion [Sample 1c] when both have a common coating weight of 40 g/m². When the OPW cushions are not coated, the calendered cushion [Sample 1b] has an improved leakage performance over that for non-calendered OPW cushions [Sample 1a]. The evidence being the lower volume of air (in Liters) required to achieve the set pressure and the higher absolute pressure (in kPa) achieved. The primary site of leakage of the calendered and coated OPW is through the seam.

TABLE 1

| Sample ID. | OPW; Calendered | Overall silicone coating (g/m²) | Max pressure (kPa) | Volume of air (liters) required to set pressure 40 kPa | 80 kPa | Decay time (s) | Initial leakage mechanism |
|---|---|---|---|---|---|---|---|
| 1a | No |  | 41 | 4310 |  | <10 | seam |
| 1b | Yes |  | 48 | 3114 |  | <10 | seam |
| 1c | No | 40 | 88 | 202 | 881 | <10 | in plane + face fabric |
| 1d | Yes | 40 | 89 | 335 | 1536 | <10 | seam + in plane |

Examples 2(a-d)

The test data in Table 2 below show that a non-calendered OPW cushion with a hot melt adhesive applied to the seams, when coated with 40 g/m² [Sample 2b] and 20 g/m² [Sample 2c] overall coating, gives significantly better leak tightness when compared to a non-calendered OPW cushion without hot melt adhesive on the seams, but with 75 g/m² [Sample 2a] overall coating weight. This indicates that overall coating weight can be reduced by applying hot melt adhesive to the seams. The table below also shows the results for localized tape application to the seams [Sample 2d]. While a similar trend is observed, the tape is not as effective a seam sealant as the hot melt adhesive. Evidence for this is although a similar volume of air was required to reach specific pressures, the decay time from the maximum pressure was longer for Samples 2b or 2c than that measured for Sample 2d. This may be because the tape does not penetrate into the seam as well as the lower viscosity hot melt adhesive.

TABLE 2

| Sample ID. | OPW; Calendered | Localized seam protection | Overall silicone coating (g/m²) | Max pressure (KPa) | Volume of air (liters) required to set pressure 40 kPa | 80 kPa | 100 kPa | 140 kPa | Decay time (s) | Initial leakage mechanism |
|---|---|---|---|---|---|---|---|---|---|---|
| 2a | No | No | 75 | 110 | 158 | 766 | 2944 |  | <10 | in plane |
| 2b | No | Hot melt adhesive | 40 | 142 | 176 | 307 | 388 | 601 | 96 | face fabric |

TABLE 2-continued

| Sample ID. | OPW; Calendered | Localized seam protection | Overall silicone coating (g/m²) | Max pressure (KPa) | Volume of air (liters) required to set pressure | | | | Decay time (s) | Initial leakage mechanism |
|---|---|---|---|---|---|---|---|---|---|---|
| | | | | | 40 kPa | 80 kPa | 100 kPa | 140 kPa | | |
| 2c | No | Hot melt adhesive | 20 | 123 | 201 | 438 | 726 | | 51 | face fabric |
| 2d | No | Tape | 40 | 143 | 174 | 262 | 309 | 399 | 14 | face fabric |

Examples 3(a-f)

Table 3 below shows results of applying a hot melt adhesive, a tape or a localized conventional coating to the seams of an OPW cushion which had been pre-calendered. In each case the observed order of efficacy—hot melt adhesive was best [Samples 3a and 3d] followed by localized seam coating [Samples 3b and 3e] followed by seam tape [Samples 3c and 3f]. When the OPW fabric was pre-calendered [Samples 3a-c] versus non-calendered [Samples 3d-f], the results were superior in each case in terms of less air volume required to reach maximum pressure.

TABLE 3

| Sample ID. | OPW; Calendered | Localized seam protection | Max pressure (kPa) | Volume of air (liters) required to 40 kPa | Decay time (s) | Initial leakage mechanism |
|---|---|---|---|---|---|---|
| 3a | Yes | hot melt adhesive | 55 | 1228 | 30 | face fabric |
| 3b | Yes | silicone coating | 51 | 1518 | <10 | face fabric |
| 3c | Yes | tape | 51 | 1741 | 11 | face fabric |
| 3d | No | hot melt adhesive | 51 | 1917 | 24 | face fabric |
| 3e | No | silicone coating | 48 | 2041.5 | <10 | face fabric |
| 3f | No | tape | 45 | 2955 | <10 | face fabric |

Examples 4(a-c)

The test data in Table 4 below show that by using a pre-calendered OPW cushion, and by applying hot melt adhesive to the seams, that a lighter overall coating weight of 20 g/m² [Sample 4c] and 40 g/m² [Sample 4a] can be used and still achieve a significantly better leakage performance than a non-calendered regular OPW cushion with 75 g/m² overall coating weight [Sample 2a in Table 2]. These results when compared to Table 2 indicate that pre-calendering the OPW cushion and then applying hot melt adhesive to the seams gave a superior leak performance. Sample 4a in Table 4 showed a particularly good leak performance. This result shows that this would be an improved solution compared to current technology for a roll over side curtain airbag which needs to remain inflated for several seconds after deployment. Sample 4b in Table 4 which had a tape applied to the seam, gave improved performance compared to the non-calendered version, but was less effective compared to the hot melt adhesive samples tested.

TABLE 4

| Sample ID. | OPW; Calendered | Localized seam protection | Overall silicone coating (g/m²) | Max pressure (kPa) | Volume of air (liters) required to set pressure | | | | Decay time (s) | Initial leakage mechanism |
|---|---|---|---|---|---|---|---|---|---|---|
| | | | | | 40 kPa | 80 kPa | 100 kPa | 140 kPa | | |
| 4a | Yes | Hot melt adhesive | 40 | 143 | 157 | 234 | 276 | 350 | 127 | in plane |
| 4b | Yes | Tape | 40 | 143 | 124 | 187 | 231 | 296 | 17 | in plane |
| 4c | Yes | Hot melt adhesive | 20 | 124 | 160 | 253 | 362 | | 70 | in plane |

Examples 5(a-b)

Table 5 below shows results following application of a conventional coating to the seams of a non-calendered OPW cushion, with subsequent coating application to the overall OPW cushion. The addition of localized coating to the seam improves the gas volume necessary to reach a set pressure in comparison to the more heavily coated OPW cushion without the localized coating [Sample 2a in Table 2]. Interestingly, the leak performance of the OPW cushion with overall coating of 20 g/m² was equivalent to that with the overall coating of 40 g/m². However, the improvement resulting from local coating of the seam was inferior to that resulting from application of hot melt adhesive to the seams [Samples 2b & 2c in Table 2]. This is presumably because the hot melt adhesive penetrates further into the seam forming a better barrier to air leakage.

TABLE 5

| Sample ID. | OPW; Calendered | Localized seam protection | Overall silicone coating (g/m²) | Max pressure (kPa) | Volume of air (liters) required to set pressure | | | Decay time (s) | Initial leakage mechanism |
|---|---|---|---|---|---|---|---|---|---|
| | | | | | 40 kPa | 80 kPa | 100 kPa | | |
| 5a | No | silicone coating | 40 | 105 | 207 | 624 | 1171 | <10 | in plane |
| 5b | No | silicone coating | 20 | 108 | 197 | 537 | 1104 | <10 | in plane + face fabric |

Examples 6(a-b)

Table 6 below shows results when a conventional coating is applied locally to the seams of a pre-calendered OPW airbag. The leakage performance was improved by application of the localized coating, so enabling a lower overall coating weight to be used, as for Sample 2a in Table 2, where a heavy overall coating weight was used. However, the results are inferior to those of Samples 4a and 4c in Table 4 when seam sealing was achieved with application of hot melt adhesive to the pre-calendered OPW cushion. This observation is consistent with an improved penetration of the hot melt adhesive into the seam.

TABLE 6

| Sample ID. | OPW; Calendered | Localized seam protection | Overall silicone coating (g/m²) | Max pressure (kPa) | Volume of air (liters) required to set pressure | | | Decay time (s) | Initial leakage mechanism |
|---|---|---|---|---|---|---|---|---|---|
| | | | | | 40 kPa | 80 kPa | 100 kPa | | |
| 6a | Yes | silicone coating | 40 | 102 | 173 | 718 | 1284 | <10 | In plane |
| 6b | Yes | silicone coating | 20 | 101 | 239 | 953 | 1629 | <10 | In plane |

Examples 7(a-f)

Table 7 below shows the leak test results when various light weight multi-layer films were adhered to pre-calendered OPW cushions. The two types of films used in these examples, i.e., labeled as Film 1 and Film 2, are described in the Test methods and Procedures section above. The test data indicate that the application of a light weight film to pre-calendered OPW cushions [Samples 7a, 7c, 7e] results in an improved leak performance compared to when the same film was applied to regular non-calendered OPW cushions [Samples 7b, 7d, 7f].

TABLE 7

| Sample ID. | OPW; Calendered | Localized seam protection | Overall Film 1 (g/m²) | Overall Film 2 (g/m²) | Max pressure (kPa) | Volume of air (liters) required to set pressure | | Decay time (s) | Initial leakage mechanism |
|---|---|---|---|---|---|---|---|---|---|
| | | | | | | 40 kPa | 80 kPa | | |
| 7a | Yes | No | — | 38 | 72 | 172.5 | 1021 | <10 | seam |
| 7b | No | No | — | 38 | 76 | 601.5 | 1482.5 | <10 | seam |
| 7c | Yes | No | — | 20 | 57 | 717 | | <10 | seam |
| 7d | No | No | — | 20 | 55 | 2487.5 | | <10 | seam |
| 7e | Yes | No | 40 | — | 66 | 798.5 | 2224 | <10 | in plane |
| 7f | No | No | 40 | — | 47 | 2342 | | <10 | in plane |

Examples 8(a-b)

In these examples, the regular OPW design which had, been used in all examples described above, was modified to include a double stitch around the entire seam, located 0.3 cm into the OPW chamber away from the OPW seam, for example ≥0.2 to ≤0.4 cm. There were 6 stiches on 8 ends per 16 picks area (0.18 mm² area). The test data are displayed in Table 8 below. The data for Sample 8a and 8b, when compared to the results of the regular coated OPW Sample 2a in Table 2, show that for sample 8b which has a lighter overall coating, a lower volume was required to reach a set pressure, and for sample 8a at an equivalent overall coating weight as Sample 2a there was also an increased deflation time and maximum pressure achieved.

TABLE 8

| Sample ID. | OPW; Calendered | Seam modification | Overall silicone coating (g/m²) | Max pressure (kPa) | Volume of air (liters) required to set pressure | | | Decay time (s) | Initial leakage mechanism |
|---|---|---|---|---|---|---|---|---|---|
| | | | | | 40 kPa | 80 kPa | 100 kPa | | |
| 8a | No | Addition of stitches | 75 | 120 | 127 | 328 | 585 | 11 | in plane |
| 8b | No | Addition of stitches | 40 | 106 | 192 | 953 | 1768 | <10 | in plane + face fabric |

INDUSTRIAL APPLICABILITY

The systems and methods disclosed herein are applicable to the automotive industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for decreasing air leakage from a one piece woven (OPW) airbag, said method comprising:
   forming an OPW airbag having seams;
   applying a hot melt sealant material to one or more seams of the OPW airbag; and
   compressing the hot melt sealant material into the seams.

2. The method of claim 1, further comprising calendering the OPW airbag before application of the sealant material to the one or more seams.

3. The method of claim 1, further comprising applying a lightweight coating over the OPW airbag, after applying the sealant material to the one or more seams.

4. The method of claim 1, wherein the lightweight coating is in the form of a lightweight film selected from polyurethanes, polyamides, polyolefins and polyesters, or is formed from dispersions of silicone-based coatings such as polydimethylenesiloxane, polyurethane and rubber compositions such as polychloroprene, having a weight per unit area selected from ranges selected from the group consisting of from ≥5 g/m² to ≤40 g/m² and from ≥5 g/m² to ≤20 g/m².

5. The method of claim 1, wherein the hot melt sealant material has a melting range less than that of a fabric of the OPW airbag, such as from ≥50° C. to ≤180° C., or from ≥120° C. to ≤160° C.

6. The method of claim 1, wherein the hot melt sealant material further comprises tracer compound which when illuminated with ultraviolet light fluoresces in the visible light range, and the method further comprises tracing the application of the hot melt sealant material with ultraviolet light.

7. The method of claim 1, wherein the hot melt sealant material is selected from a micropore penetrable, low viscosity, low surface tension sealant, a low thickness film, an adhesive web, or an impermeable multi-layer film.

8. An OPW airbag comprising:
   a one piece woven fabric, wherein a major portion of the fabric has multiple woven layers, a minor portion of the fabric having fewer woven layers than the major portion, and a seam between edges of major portions, and major and minor portions;
   the seam is coated with a hot melt sealant material; and
   the hot melt sealant material is compressed into the seam.

9. The OPW airbag of claim 8, wherein the seam constitutes ≥2% and ≤14% of the surface area of the OPW airbag.

10. The OPW airbag of claim 8, wherein the hot melt sealant material is a reactive polyurethane having a melting point range of from ≥50° C. to ≤180° C., or from ≥120° C. to ≤160° C.

11. The OPW airbag of claim 8, wherein the airbag is calendered before application of the hot melt sealant material.

12. The OPW airbag of claim 8, wherein the major, minor and seam portions of the airbag are coated with a light weight coating selected from silicone-based coatings (such as poly-dimethylenesiloxane), urethanes (such as polyurethane) and rubber compositions (such as polychloroprene), and wherein the light weight coating has a weight per unit area selected the group of ranges consisting of:
   a. from ≥5 $g/m^2$ to ≤40 $g/m^2$; and
   b. from ≥5 $g/m^2$ to ≤20 $g/m^2$.

13. The OPW airbag of claim 8, wherein the major portion of the fabric is characterized by a gas permeability of <1 $l/dm^2/min$, measured by Static Air Permeability with a test area of 100 $cm^2$ and test pressure of 500 Pa.

14. The OPW airbag of claim 8, wherein the hot melt sealant material is present at a level of less than 100 $g/m^2$.

15. The OPW airbag of claim 8, which has an average coating weight over the entire surface of the airbag is selected from the group of ranges consisting of:
   a. from ≥10 $g/m^2$ to ≤65 $g/m^2$;
   b. ≥10 $g/m^2$ to ≤35 $g/m^2$; and
   c. ≥10 $g/m^2$ to ≤25 $g/m^2$.

16. The OPW airbag of claim 8, wherein the airbag fabric has been calendered and wherein a light weight film has been applied to the calendered airbag fabric.

17. The OPW airbag of claim 16, wherein the light weight film has been applied in the absence of separate seam sealing.

18. A method for decreasing air leakage from an OPW airbag, said method comprising:
   a. calendering the OPW airbag;
   b. compressing a hot melt sealant material into a seam of the OPW airbag; and
   c. laminating a film to the OPW airbag.

19. The method of claim 18 whereby the calendering of the OPW airbag reduces the leakage rate through the cut edge of the airbag by in-plane gas flow.

20. The method of claim 18, wherein the film is applied with heat and/or pressure.

* * * * *